Nov. 3, 1964 W. T. HARRIS 3,155,852

TRANSDUCER CONSTRUCTION

Original Filed June 9, 1958

INVENTOR
WILBUR T. HARRIS
BY
James and Franklin
ATTORNEYS

United States Patent Office 3,155,852

Patented Nov. 3, 1964

3,155,852

TRANSDUCER CONSTRUCTION

Wilbur T. Harris, Woodbury, Conn., assignor to The Harris Transducer Corporation, Woodbury, Conn., a corporation of Connecticut Original application June 9, 1958, Ser. No. 740,931, now Patent No. 2,964,837, dated Dec. 20, 1960. Divided and this application Dec. 5, 1960, Ser. No. 73,821
10 Claims. (Cl. 310—26)

This invention relates to magnetostrictive transducers and more particularly to their assembly and manufacture.

This application is a division of my copending application Serial No. 740,931 filed June 9, 1958, now Patent No. 2,964,837, and entitled "Method of Transducer Manufacture."

In many magnetostrictive transducer applications, maximum efficiency of energy transfer occurs when the energy is transmitted from the transducer to the utilization medium in a longitudinal direction with little transfer in a transverse direction. Thus, maximum energy transfer is obtained when all the members comprising the transducer are aligned longitudinally with a minimum of lateral skewing in any of the members.

It is accordingly an object of the invention to provide a construction for magnetostrictive transducers in which the alignment of the elements of the transducer is carefully controlled.

It is still a further object of the invention to provide a uniquely constructed transducer including permanently installed alignment bars.

It is a feature of the invention to bond a magnetostrictive member to non-magnetic end members, the bonding material being a thermosetting material and the coefficient of expansion of the terminal members being greater than that of the magnetostrictive member.

Other objects and various other features of novelty and invention will be pointed out or will occur to those skilled in the art from a reading of the following specification in conjunction with the acompanying drawings. In said drawings, which show forth for illustrative purposes only, preferred forms of the invention:

Figures 1, 2, 3:
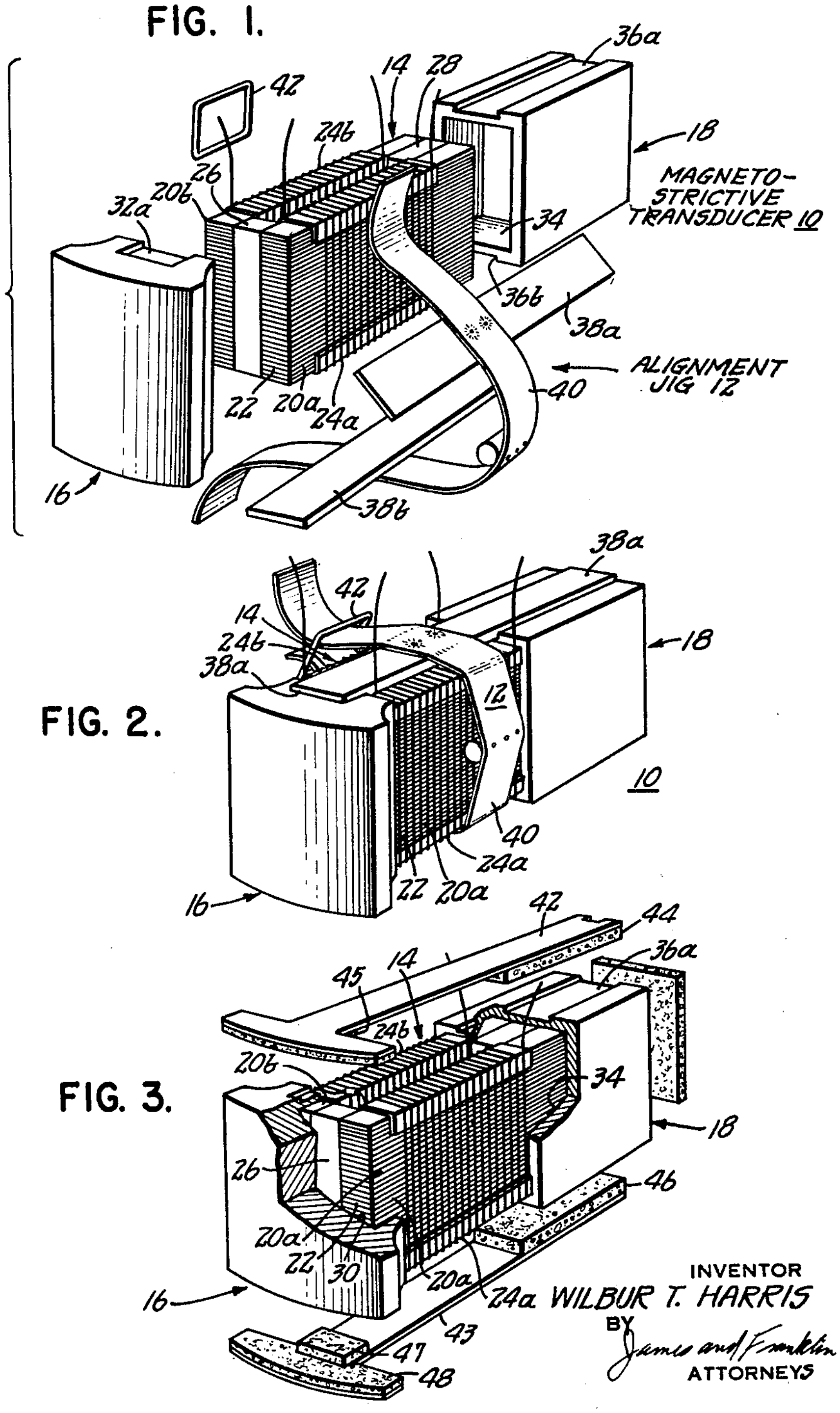
FIGURE 1 is an exploded view of a magnetostrictive transducer and an alignment jig in accordance with one aspect of the invention.
FIGURE 2 is a perspective view of the assembled magnetostrictive transducer with the alignment jig in position.
FIGURE 3 shows in greater detail the magnetostrictive transducer.

In accordance with an aspect of the invention, a transducer is disclosed including a magnetostrictive member and opposite non-magnetic terminal members. Each terminal member has a socketed end, and a coefficient of expansion greater than that of the magnetostrictive member. The transducer may be assembled by positioning the opposite end of the magnetostrictive member in the socketed end of the respective terminal members, one of which contains a thermosetting bonding material. The magnetostrictive member is aligned relative to said terminal members and while aligned, heated until the thermosetting bonding material solidifies.

The unbonded terminal member is then removed and a quantity of bonding material is applied to the socket, and the magnetostrictive member reinserted. The members are again aligned and heated, until the bonding material solidifies. The assembly is then cooled and, as a result of the greater expansion of the terminal members during the heat treatment, the resultant contraction produces an extremely rigid and rugged bond between the terminal and magnetostrictive members.

Referring to FIGURE 1, a magnetostrictive transducer 10 is shown comprising a magnetostrictive member 14, a head member 16 and a tail member 18. The magnetostrictive member 14 is formed by developing a pair of stacks 20*a* and 20*b* of rectangular laminae of magnetostrictive material such as nickel. Preformed windings 24*a* and 24*b* are respectively slid over the stacks 20*a* and 20*b*. A coupling spacer 26 of a ferromagnetic material such as one of the commercially available ferrites is positioned between the stacks 20*a*, 20*b* to provide a low reluctance path between corresponding stack ends. At the other end of the stacks 20*a*, 20*b*, a magnetic spacer 28 is inserted. The magnetic spacer 28 serves to complete the magnetic circuit, and establishes a permanent magnetic bias in the magnetostrictive member. To insure a more linear distribution of the permanent magnetic field in the stacks 20*a*, 20*b*, the coupling spacer 26 may also be a permanent magnet, oriented to reinforce the magnetic field established by the magnetic spacer 28.

After the above stated elements are bonded together by a bonding material such as, for example, an epoxy resin, they are ready for final assembly with the head member 16 and the tail member 18. The head member 16, which contacts the medium to be excited, is fabricated from a non-magnetic material such as aluminum. One end of the head member 16 has a socket 30 to accommodate an end 22 of the magnetostrictive member 14 (see FIGURE 3). Grooves 32*a* are formed in the top and bottom sides of the head member 16, only the groove in the top member being shown. The width of grooves 32*a*–36*a* may be substantially equal to the thickness of the coupling spacer 26 and the magnetic spacer 28.

Similarly, one end of the tail member 18 (fabricated from a non-magnetic material such as zinc) has a socket 34 to accommodate the other end of the magnetostrictive member 14. Corresponding grooves 36 (*a–b*) are formed in the top and bottom sides of the tail member 18.

In assembling the several component parts, a thermosetting bonding agent such as epoxy resin is first introduced into the socket 34 of the tail member 18, socket 34 being upwardly facing to receive and contain the resin. One end of the wound stacks including the coupler or magnet is positioned in the socket 34, while the other end is positioned in the socket 30 of the head member 16 to form an assembly; at this stage, socket 30 serves only a locating function and contains no resin. The jig rods 38 (*a–b*) riveted to the hinged strap 40 of the alignment jig 12 are fitted into the grooves of the head and tail members. In particular, the top jig rod 38*a* is accommodated by the groove 32*a* of the head member 16 and the groove 36*a* of the tail member 18, while the bottom jig rod 38*b* is accommodated by corresponding grooves in the bottom sides of the head and tail members to provide longitudinal axial alignment. Finally, the clamp 42 is fitted over the strap 40 and the alignment jig 12 is locked to prevent any possible lateral movement of the members.

In the first bonding step, the entire assembly is upended and rested on the end of the tail member 18 to permit possible settling of the magnetostrictive member 14 in the socket 34, and to assure filling of any voids. The assembly is heated in this position until the thermosetting bonding agent solidifies. Since the coefficient of expansion of the zinc tail member 18 is greater than the coefficient of expansion of the nickel magnetostrictive member 14, the contraction which results from subsequent cooling of the assembly produces a combined bonded and clamped type fastening of head and tail members.

After the assembly is cooled, the alignment jig 12 is unclamped and the head member 16 removed from the assembly. Thermosetting bonding material is then applied to the socket 30 of the head member 16, the socket 30 being then upwardly facing to receive and contain the bonding material. The assembly is reformed be inserting the free end of the magnetostrictive member 14 into the socket 30 of head member 16. Alignment is reestablished by engaging the jig rods 38 (*a–b*) into their mating grooves. By keeping the assembly upended and resting it on the free end of the head member 16, another settling and void filling operation is performed. Heat is reapplied to the assembly, and since the aluminum of the head member 16 expands more than the nickel of the magnetostrictive member 14, a rigid bonded fit is established between the head member 16 and the magnetostrictive member 14 when the assembly has cooled. Since the metals and thermosetting bonding material are sufficiently elastic to withstand thermal stresses, no deleterious strains are introduced.

In the above discussion, the magnetostrictive member 14 was described as being first bonded to the tail member 18. Obviously, the sequence of bonding the members 16 and 18 is immaterial.

It should be further noted that although a specific form of alignment jig has been disclosed, most any alignment jig which will conveniently permit the longitudinal alignment of the three members is suitable. The main function of the alignment jig is to prevent any lateral movement and consequent displacement of the head, tail and magnetostrictive members.

Referring to FIGURE 3, the transducer is shown with non-magnetic, alignment and spacer bars 42, 43. In one application of the transducer, multiple units are employed in a circular array; the transducer extending radially, and also in vertical banks. When arranged vertically, the aligned units are spaced from each other by the bars 42, 43 and a similarly shaped metal spacer (not shown).

Each of the bars 42, 43 also serves to position the magnetostrictive member securely in an assembly. The contacting surfaces of the bars 42, 43 are provided with cork keys 44, 45 and 46, 47 respectively, which fit snugly in the grooves **36*a*, 32*a* and 36*b* and the groove at the underside of the head 16, not shown. The bars are substantially in the shape of a T, the cross-bar of the T being positioned on the terminal head of the unit. A cork layer 48 is provided on the contacting surface of the cross-bar. The thickness of the cork keys 44, 45, 46 and 47** is proportionately greater so that the bars nest evenly on the opposed surfaces of the transducer.

As will be apparent to those skilled in the art, the magnitude and direction of current flowing through the windings **24*a* and 24*b* will cause the magnetostrictive member 14 to expand and contract, thus causing relative movement between the head member 16 and the tail member 18. The tail member 18 will customarily be substantially fixedly mounted, and the movement of the head member 16**, which is normally operatively connected to the medium through which vibrations are to be transmitted, will impart vibration to that medium.

There has thus been shown and described a transducer of unique construction, in which the magnetostrictive members are readily exactly aligned, and which is characterized by great structural stability and ruggedness.

While I have described the invention in detail for a preferred construction, it will be understood that modifications may be made without departing from the scope of the invention as defined in the claims which follow.

I claim:

1. A transducer comprising a magnetostrictive member, an electric winding operatively associated therewith, a pair of opposite non-magnetic terminal members, each terminal member having a socket, means bonding the opposite ends of said magnetostrictive member on the sockets of said terminal members respectively, aligned grooves in said opposite terminal members, and a bar mounted in said grooves.

2. The transducer of claim 1, in which said grooves are formed on external surfaces of said terminal members and said bar comprises a body part and projecting parts, said projecting parts fitting into said grooves and said body part extending above the surfaces of said terminal members in which said grooves are formed.

3. The transducer of claim 2, in which said projecting parts are formed of cork-like material.

4. The transducer according to claim 1, and further comprising grooves in two opposite surfaces of each terminal member, and a pair of said bars mounted respectively in aligned grooves in said opposite terminal members.

5. The transducer of claim 4, in which said grooves are formed on external surfaces of said terminal members and said bar comprises a body part and projecting parts, said projecting parts fitting into said grooves and said body part extending above the surfaces of said terminal members in which said grooves are formed.

6. A transducer comprising a magnetostrictive member, an electric winding operatively associated therewith, a pair of opposite non-magnetic terminal members, means securing the opposite ends of said magnetostrictive member to said terminal members respectively, aligned grooves in said opposite terminal members, and a bar mounted in said grooves, said grooves being formed on external surfaces of said terminal members, said bar comprising a body part and projecting parts, said projecting parts fitting into said grooves and said body part extending above the surfaces of said terminal members in which said grooves are formed, said projecting parts being formed of cork-like material.

7. The transducer of claim 6, in which said body part of said bar has a portion which extends over an ungrooved portion of a terminal member.

8. The transducer of claim 7, in which said portion of said body part of said bar carries a layer of cork-like material interposed between itself and said ungrooved terminal member portion.

9. The transducer of claim 6, in which said body part of said bar comprises a cross-piece which extends over an ungrooved portion of a terminal member.

10. The transducer of claim 9, in which said cross-piece carries a layer of cork-like material interposed between itself and said ungrooved terminal member portion.

References Cited by the Examiner

UNITED STATES PATENTS

| | | | |
|---|---|---|---|
| 2,842,689 | 7/58 | Harris | 310—26 |
| 2,930,912 | 3/60 | Miller | 310—26 |
| 2,947,890 | 8/60 | Harris et al. | 310—26 |

MILTON O. HIRSHFIELD, *Primary Examiner.*